United States Patent Office 3,309,441
Patented Mar. 14, 1967

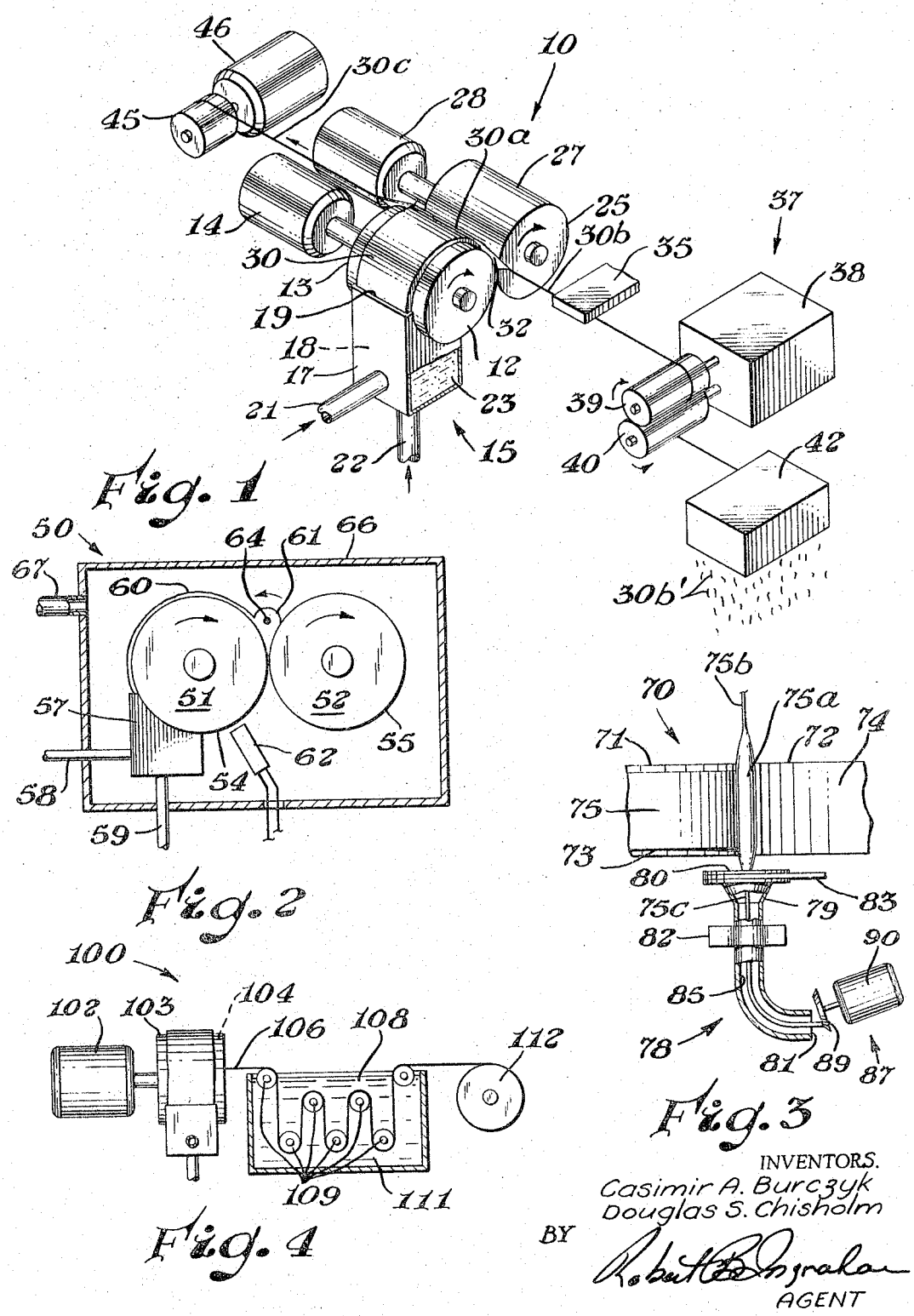

3,309,441
PROCESSING OF POLYMERS AND APPARATUS THEREFOR
Casimir A. Burczyk and Douglas S. Chisholm, Midland, Mich., assignors to The Dow Chemical Company, Midland, Mich., a corporation of Delaware
Filed Dec. 3, 1965, Ser. No. 511,368
16 Claims. (Cl. 264—85)

This invention relates to the processing of synthetic resins and apparatus therefor. It more particularly relates to a method and means for providing polymers in strandular or particulate form.

Many synthetic resins or polymers are prepared in granular or powder form by suspension polymerization, emulsion polymerization and subsequent coagulation or by precipitation of a polymer from a solution thereof. Generally, such powdery materials are oftentimes unsatisfactory for use in plastics processing equipment because of low bulk density. Such powdery polymers oftentimes are difficult to feed to a heat fabricating apparatus such as an extruder or a molding machine and the like. In many cases, heating of the polymers under pressure permits heat forming into a strand which is chopped or cut into granules which are more easily and readily handled than the powdery materials.

Certain polymers, particularly halogenated materials such as Saran resins which are copolymers containing major proportions of vinylidene chloride copolymerized with one or more olefinically unsaturated materials such as vinyl chloride, acrylonitrile and the like, are exceptionally sensitive to heat in that decomposition of such polymers is generally considered to be autocatalytic. Such heat-sensitive polymers may be heat fabricated at temperatures sufficiently high to render them thermoplastic but cannot safely be maintained at such heat fabricating temperatures for more than a minimum length of time. Such heat-sensitive or unstable materials generally must be heat fabricated in equipment especially designed and constructed to provide generally streamline flow therethrough to assure that no portion of the material remains within the heat fabricating apparatus for a length of time sufficient to cause obvious severe decomposition. Thus, the extrusion of such heat-sensitive materials requires not only special equipment which is fabricated from corrosion-resistant alloys, often of the nickel variety, but requires special techniques wherein a heat fabricating machine such as an extruder is started with a non-decomposing material of high heat stability, for example, polystyrene, and when the desired heat fabricating temperatures are reached, the heat-sensitive material is fed to the apparatus and the apparatus maintained in continuous operation and subsequently purged with a non-heat-sensitive material before it may be shut down. Such heat sensitive polymers may be processed for greater or lesser lengths of time in a zone of high temperature. By high temperature is meant the temperature at which the material becomes thermoplastic and is processable. Such heat-sensitive materials oftentimes exhibit stability in their finished fabricated form which is more or less inversely proportional to the heat history during fabrication. By the term "heat history" is meant the length of time the polymer has been maintained at a high temperature or above the normal temperature of use. Thus, in fabricating shaped articles and the like from heat-sensitive polymers and polymeric compositions, it is highly desirable that they be fabricated as rapidly as possible and employ minimal temperatures.

It would be desirable if there were available a method and apparatus for the processing of thermoplastic resinous heat-sensitive materials which requires a minimal heat history.

Further, it would be desirable if there were available a method and apparatus for the fabrication of heat-sensitive thermoplastic resinous materials into strandular or particulate form.

Also, it would be desirable if such a method and apparatus were simple and readily maintained.

These benefits and other advantages in accordance with the method of the present invention are achieved by applying a powdered heat-sensitive thermoplastic resinous material to a heated rotating configuration, maintaining the synthetic resinous material on the surface of the rotating configuration for a sufficient period to render it thermoplastic, rotating a second rotating configuration adjacent the first configuration in a like direction, causing the heat-plastified thermoplastic resinous material to form a rolling bank in a space defined between the first and second rotating configurations and removing the heat-plastified resinous material in a direction away from the rolling bank and generally parallel to the surface of the configuration in the form of at least one continuous strand.

The method of the invention is advantageously practiced by employing the apparatus in accordance with the invention which comprises in cooperative combination a first drum, a second drum, a particulate resin supply means and a strand take-away means, the first and second drums being rotatably mounted and having their surfaces generally parallel, each of the drums having a surface of rotation, the surfaces of the drums being disposed in closely spaced adjacent relationship to each other, the resin supply means so constructed and arranged as to supply particulate resin to the surface of the first drum, means to heat the first drum to a temperature sufficient to heat-plastify the resin, means to rotate the first drum and the second drum in like directions about their axes of generation and means to remove a strandular article from a space defined by the surface of the first drum and the second drum in a direction generally parallel to the axes of rotation of the first and second drums.

Further features and advantages of the present invention will become more apparent from the following specification when taken in connection with the drawing wherein:

FIGURE 1 is a schematic simplified isometric illustration of one embodiment of the invention;

FIGURE 2 illustrates a view of an alternate embodiment of the invention; and

FIGURES 3 and 4 depict alternate means of treating a polymer material produced in accordance with the method of the invention.

In FIGURE 1 there is schematically illustrated an isometric view of the elements of an apparatus generally designated by the reference numeral 10. The apparatus 10 comprises in cooperative combination a first heated, generally cylindrically roll or configuration 12 having a cylindrical surface 13. The roll 12 is rotatably supported and heated by a rotating and heating means 14. A fluid bed applicator or resin supply means 15 is disposed generally adjacent the cylindrical surface 13 of the roll 12. The fluid bed applicator 15 comprises a housing 17 defining an internal cavity 18. The internal cavity 18 is in communication with the surface 13 by means of an opening 19 defined by the housing 17. A polymer supply 21 is in operative communication with the cavity 18 of the housing 17. A fluidizing fluid source 22 is in operative communication with the housing 17 and arranged to fluidize particulate polymeric particles 23 supplied from the polymer supply 21. A roll 25 is disposed generally adjacent to the roll 12. The roll 25 has an external cylindrical surface or configuration 27. The roll 25 is rotated, supported and heated by a roll heating, supporting and rotating means 28. The rolls 12 and 25 are disposed in generally adjacent parallel arrangement whereby the surfaces 13 and 27 of the rolls 12 and 25 are disposed sufficiently closely to each other to permit a running clearance. A band of heat-plastified polymeric material 30 is disposed on a portion of the cylindrical surface 13 of the drum 12. The band 30 is carried into a nip 32 disposed generally between the adjacent portions of the cylindrical surfaces 13 and 27. Within the nip is a rolling bank of heat-plastified, thermoplastic, resinous material 30a. Strands 30b and 30c of the heat-plastified, thermoplastic material forming the bank 30a are withdrawn from the bank 30a in a direction indicated by the arrows. Generally adjacent the roll 25 and the bank 30a is disposed a cooling means 35 adapted to lower the temperature of the strand 30b below the heat plastifying temperature of the material forming the strand 30b. Generally adjacent the rolls 12 and 25 is disposed a takeaway means 37 which comprises in cooperative combination a drive means 38 which supports and rotates a pair of takeaway rolls 39 and 40, respectively. Adjacent the takeaway means 37 and remote from the rolls 12 and 25 is disposed comminuting means or chopper 42. A stream of particulate, thermoplastic, resinous material 30b' is illustrated emerging from the chopper 32. Generally adjacent the drive means 14 and 28 is disposed a winding draw roll 45 driven by a drive and support means 46 such as a gear head motor of suitable speed.

In operation of the apparatus of FIGURE 1, the rolls 12 and 25 are heated to a desired temperature and rotated at a predetermined rate. A particulate, thermoplastic, resinous material is supplied to the space or cavity 18 of the housing 17 by the source 21 from the fluidizing fluid supply means 22 in a sufficient quantity to fluidize the particles 23 of resinous material thereby forming a fluid bed of sufficient height to contact the portion of the surface 13 of the roll 12, the particles passing through the opening 19 of the housing 17 contact the heated surface 13 of the roll 12, the thermoplastic, resinous particles 23 are raised to above their thermoplastic temperature and adhered thereto in the form of a band which is either continuous or discontinuous depending upon the temperature of the surface 13 and supply rate of the particles 23. The band 30 is moved toward the nip 32, at which point it is engaged by the surface 27 of the roll 25 and forms a rolling bank. The temperature of the roll 25 is generally maintained at a lower temperature than the roll 12 to assure that the rolling bank 30a remains between the rolls and that the band 30 is not transferred to the roll 25. Alternately, if desired, the roll 25 may be provided with a surface which is non-adherent to the material being processed. For example, most thermoplastic, resinous material does not adhere to a polytetrafluoroethylene coating or, alternately, the surface 27 may be treated with a mold release agent, such as zinc stearate and the like, such conditions depending primarily upon the particular thermoplastic, resinous material being processed. The selection of such release materials being well within the ability of one skilled in the art of plastic processing. When sufficient material has accumulated on the nip 32 between the rolls 12 and 25 to form a roll bank 30a, the material is expressed in a generally axial direction as the rolling bank increases in size. A portion of the bank is grasped and stretched to form a strand, such as the strands 30b and 30c, and withdrawn at a rate about equal to the rate at which material is supplied to the bank 30a, by the band 30. Advantageously, the strand 30b is cooled quickly by means of the cooling means 35 and passed to draw rolls 39 and 40, subsequently into a comminuting device, such as the chopper 42 and comminuted to particulate material, such as the material 30b', which may then be employed in molding extrusion and the like. Alternately, a strand such as the strand 30c may be directly wound onto a supply roll such as the roll 45 or directly fed to a heat-fabricating apparatus without cooling.

In FIGURE 2 there is illustrated a schematic sectional view of an alternate embodiment of the invention generally designated by the reference numeral 50. The apparatus 50 comprises a first roll 51 and a second roll 52 generally corresponding to the rolls 12 and 25 of FIGURE 1. The rolls 51 and 52 have generally cylindrical surfaces 54 and 55 which are disposed also in adjacent, closely spaced relationship to each other. A fluid bed 57 is disposed adjacent the surface 54 of the roll 51 in a manner similar to the bed 15. A particulate polymer supply means 58 and a fluidizing fluid supply means 59 are in operative combination with the bed 57. A band of heat-plastified, thermoplastic, resinous material 60 is disposed on a portion of the roll 51 and terminates in a rolling bank 61 disposed in a nip 62 defined by the adjacent cylindrical surfaces 54 and 55 of the rolls 51 and 52. A heating means 62 such as an induction heater is adjacent the surface 54 of the roll 51. A strand of heat-plastified, synthetic, resinous, thermoplastic material 64 is being withdrawn from the rolling bank 61. The rolls 51 and 52 and the bank 61 rotate in the directions indicated by the arrows. A housing or enclosure 66 encloses the fluidized bed 57 in the rolls 51 and 52. An inert gas supply means 67 is in operative communication with the enclosure 66. The embodiment of FIGURE 2 operates substantially in a manner similar to the apparatus illustrated in FIGURE 1 with the exception that the roll 51 is heated by means of an induction heater 62 and is enclosed in an inert gas atmosphere. The rotating action of the bank 61, equivalent to the bank 30a, is illustrated in FIGURE 1.

FIGURE 3 schematically depicts an alternate arrangement of apparatus in accordance with the invention generally designated by the reference numeral 70. The apparatus 70 comprises a first roll 71 and a second roll 72 having cylindrical surfaces 73 and 74, respectively. A band 75 of heat-plastified, synthetic, resinous, thermoplastic material is disposed on the surface 73 of the roll 71. The band 75 forms a rolling bank 75a in a manner similar to the bank 61 of FIGURE 2 and the bank 30a of FIGURE 1. A strand 75b and a strand 75c is withdrawn in a generally axial direction from the bank 75a. The strand 75c is fed to a centrifugal comminuting device 78. The comminuting device 78 comprises a curved rotating tube 79 having an axially disposed inlet end 80 and a circumferentially disposed outlet end 81. The tube 79 is rotatably supported in bearing means 82 and is rotated by a rotating means 83 such as a chain or belt. The tube 79 defines an internal passageway 85. Generally adjacent the outlet 81 of the tube 79 is disposed a knife or strand severing means 87. The strand severing means 87 comprises a circular rotary knife 89 rotated by a motor 90.

In operation of the modification of the invention depicted in FIGURE 3, a strand such as the strand 73 is fed by centrifugal force by rotation of the tube 79 and subsequent rotation in a non-axial manner of the strand 75c which causes the strand 75c to be withdrawn from the bank. As the strand 75c emerges from the opening terminal portion 81, it is severed by the knife or blade 89.

FIGURE 4 schematically depicts an alternate embodiment of the invention generally designated by the reference numeral 100. The apparatus 100 comprises in cooperative combination a roll rotating means and support 102 supporting a pair of rolls 103 and 104 substantially in a similar arrangement to that illustrated in FIGURES 1 through 3. A single strand 106 is withdrawn from a rotating bank not disposed in the nip between the rolls 103 and 104. The strand 106 is passed into a cooling bath 108 containing a plurality of festooning rolls 109 and a liquid heat-transfer agent 111. The strand 196 is then wound on a supply roll 112.

The apparatus and method of the present invention are particularly adapted for use with heat-sensitive, synthetic, resinous, thermoplastic materials, particularly polymers of vinylidene chloride which can be heat-fabricated such as copolymers of a major portion of vinylidene chloride and a minor portion of vinyl chloride and copolymers of the major portion of vinylidene chloride with minor portions of other olefinically unsaturated monomers, such as vinyl acetate, ethyl acrylate, di-2-ethylhexyl acrylate,, acrylonitrile, and the like. Such compositions are well known in the art. The apparatus of the present invention is most particularly suited for rendering the copolymers containing relatively high proportions of vinylidene chloride into a thermoplastic, resinous state. By high proportion is meant a proportion of 75, 85 or even 90 weight percent vinylidene chloride copolymerized with one or more other olefinically unsaturated materials copolymerizable therewith. Many of such polymers become crystalline on cooling after varying lengths of times. The method and apparatus of the present invention provide a particularly advantageous means of transforming such vinylidene chloride copolymers from a particulate state, such as they are obtained from a suspension or emulsion polymerization process, rendering them thermoplastic with a minimum heat history whereupon the strand or strands issuing from the nip between adjacent rolls may be directly fed to a heat-fabricating apparatus such as a molding machine, extruder or compression molding apparatus and the like or the materials, if desired, are readily comminuted into molding granules.

Advantageously, utilizing the embodiment as illustrated in FIGURE 4, supercooled vinylidene chloride polymers are readily obtained which if maintained at a temperature somewhat below room temperature will retain their amorphous state for a considerable period of time and provide strip adhesives which are applied to surfaces to be joined, subsequently warmed to provide crystalline material and subsequent rigid joint.

Beneficially, the apparatus and method of the invention is useful for many applications. Various modifications may be accomplished to achieve the desired end result. For example, a comminuted strand or granules are readily obtained wherein the polymer has been subjected to a minimum heat history as evidenced by the treatment of the strand 30b in FIGURE 1. Alternately, the strand may be wound on a mandrel or drum while still in the thermoplastic state to provide a continuous sheath such as is illustrated in FIGURE 1 with the strand 30c on the drum or mandrel 45, the apparatus being relatively compact, may readily be placed in an enclosure in an inert atmosphere such as nitrogen, carbon dioxide or the like, dependent upon the particular polymeric material being used and the problems associated with the exposing of certain atmosphere-sensitive polymers is overcome. Utilizing the embodiment of FIGURE 3, a simple and compact arrangement for the production of comminuted strands is achieved, while the embodiment of FIGURE 4 is particularly suited and adapted for the production of supercooled filaments or strands.

Although cylindrical rolls are illustrated, conical rolls are also utilized with benefit wherein the smaller ends of the rolls are adjacently disposed. Employing such conical rolls the rolling bank tends to move toward the smaller ends and conveniently a single strand is removed at the smaller ends of the conical rolls. Alternately, if removal of a single strand is desirable, employing cylindrical rolls one or both of the cylindrical surfaces of the rolls is provided with a helically disposed band of the appropriate hand to move the rolling bank in the desired direction. Usually, however, it is desirable to employ a surface without such a band in order to assure minimum residence time of the heat sensitive material.

By way of further illustration, an apparatus and arrangement of rolls generally in accordance with FIGURE 1 is prepared wherein the rolls 12 and 25 are 6 inches in diameter and have cylindrical faces about 2 inches in length. The electrically heated rolls are positioned about 0.003 inch apart. The roll 12 is driven at a speed of about 30 r.p.m. and the roll 25 at a speed of about 24 r.p.m. A fluid bed, substantially as illustrated in FIGURE 1, is positioned adjacent the roll 12 and a gentle current of air fluidizes a finely divided polymeric composition entering from the source 21. The finely divided polymeric composition consists of 93.75 parts by weight of a copolymer of 85 weight percent of vinylidene chloride and 15 weight percent vinyl chloride, admixed with 4.5 parts acetyltributyl citrate, one part of an epoxidized soybean oil plasticizer, commercially available under the trade designation of Paraplex G60 and 0.7 part by weight of tertiarybutyl salol. The temperature of the roll 12 is maintained at about 180° C., while the roll 25 is maintained at a temperature of about 165° C. The particles of the polymer composition are applied to the roll by the fluid bed and are carried about the roll surface in the manner of the band 30 of FIGURE 1. A rolling bank is formed between the adjacent rolls. The rolling bank has a smooth creamy appearance and an apparent viscosity of about 1000 centipoise. The end or terminal portion of the bank is grasped and removed at a rate about equal to the supply of polymeric material from the band 30, to provide a strand of heat plastified vinylidene chloride resin which, on cooling, is subsequently severed to provide molded granules.

In other experiments, removal of the strand directly onto a rotating mandrel, wherein the strand is wound in the amorphous state wherein each turn of the helix touched the adjacent turn, forms a continuous tube. In a similar manner employing the arrangement of FIGURE 4, wherein the temperature of the cooling liquid is about 10° C., a continuous strand of supercooled amorphous vinylchloride polymer is obtained.

Similar beneficial and advantageous results are achieved when the polymer of the foregoing illustration is substituted both with a copolymer of 90 weight percent vinylchloride and 10 weight percent ethylacrylate and with a copolymer of 88 weight percent vinylchloride and 12 weight percent ethylacrylate. Similar results are achieved employing a copolymer of 85 weight percent vinylchloride and 15 weight percent acrylonitrile wherein 2 parts by weight of epoxide soybean oil are employed instead of 1 part by weight and the temperature of roll 12 is 145° C. and the temperature of roll 25 is 130° C.

Generally in the practice of the method of the present invention and the apparatus thereof, it is desirable to maintain the first roll or resin-receiving roll, such as the roll 12, at a temperature sufficiently high to cause rapid melting of the particulate resin as it contacts the surface of the roll from the fluid bed. The temperature of the roll is dependent primarily upon the rate of rotation, the diameter of the roll and like factors readily recognizable by those skilled in the art of plastics processing. However, in general, it is desirable that the temperature of the first roll, such as the roll 12, be maintained above the melting or thermoplastic temperature of the polymeric material. Whereas, the second roll or back roll, such as the roll 25, be maintained at or below the heat plastifying temperature in order to avoid sticking and the possibility of the band 30 being transferred to the roll 25. Additionally, such roll temperatures of the back roll, such as the roll 25, become less critical if an anti-sticking coating is applied thereto. Typical anti-sticking coatings may be conventional mold release agents such as waxes, various fatty acid cells such as zinc stearate, polytetrafluoroethylene coatings and the like. Heat sensitive polymers, such as the vinylidene chloride polymers, when processed in accordance with the foregoing illustration generally show increased heat stability over polymers processed by conventional extrusion techniques involving higher residence time and more severe mechanical working.

As is apparent from the foregoing specification, the invention is susceptible of being embodied with various

What is claimed is:

1. A method for fabricating powdered, heat-sensitive thermoplastic resinous material comprising
applying a powdered, heat-sensitive thermoplastic resinous material to a first heated rotating configuration,
maintaining a synthetic resinous material on the surface of the rotating configuration for a sufficient period to render it thermoplastic,
rotating a second configuration adjacent the first configuration in a like direction;
causing the heat plastified resinous material to form a rolling bank in a space defined between the first and second rotating configurations, and
removing the heat plastified resinous material in a direction away from the rolling bank and generally parallel to the surface of the configurations, the material being in the form of at least one continuous strand.

2. The method of claim 1, wherein the powdered material is applied to the configuration by means of a fluid bed.

3. The method of claim 1, wherein the first heated rotating configuration is maintained at the temperature higher than the second configuration.

4. The method of claim 1, wherein the continuous strand is severed to provide a plurality of particles.

5. The method of claim 1, wherein the strand is cooled below its heat plastifying temperature after removal from the rolling bank.

6. The method of claim 1, wherein the strand is removed at a rate about equal to the rate of applying the powdered material to the first configuration.

7. The method of claim 1, including the limitation of practicing the method of claim 1 in an inert atmosphere.

8. The method of claim 1, wherein two strands are removed from the rolling bank; the strands being removed in the opposite directions.

9. The method of claim 1, wherein the synthetic resinous material is a vinylidene chloride polymer.

10. The method of claim 1, wherein the first configuration rotates more rapidly than the second configuration.

11. An apparatus for the processing of heat sensitive particulate synthetic resinous material comprising in cooperative combination
a first drum,
a second drum,
a particulate resin supply means,
a strand takeaway means;
the first and second drums being rotatably mounted and having their axes of rotation generally parallel;
each of the drums having an external surface of rotation, the surfaces of the drums being disposed is closely spaced adjacent relationship to each other,
the resin supply means being so constructed and arranged so as to supply particulate resin to the surface of the first drum,
means to heat the first drum to a temperature sufficient to heat plastify a particulate resin,
means to rotate the first drum and the second drum in like directions about their axes, and
means to remove a continuous strandular article from a space defined by the surface of the first drum and the second drum, the means adapted to remove a strandular article in a direction generally parallel to the axes of rotation and the adjacent surfaces of the first and second drums while maintaining the longitudinal axis of the article generally parallel to the axes of the drums.

12. The apparatus of claim 11 wherein the resin supply means includes means to fluidize a bed of particulate material and cause the fluidized bed to contact the external surface of the first drum.

13. The apparatus of claim 11 including means to supply an inert atmosphere surrounding the apparatus.

14. The apparatus of claim 11 wherein the strand takeway means comprises a pair of draw rolls.

15. The apparatus of claim 11 wherein the strand takeaway means is adapted to remove two strands in opposite directions.

16. The apparatus of claim 11 including means disposed generally adjacent the rolls to cool the strand below the thermoplastic temperature thereof.

References Cited by the Examiner
UNITED STATES PATENTS 2,385,358  9/1945  Hanson _____ 264—164

ROBERT F. WHITE, *Primary Examiner.*

R. B. MOFFITT, *Assistant Examiner.*